United States Patent [19]
Deckert

[11] 3,952,233
[45] Apr. 20, 1976

[54] PRESSURE-RELIEF VALVE FOR AN ELECTRICAL CAPACITOR

[75] Inventor: Andreas Deckert, Heidenheim (Brenz), Germany

[73] Assignee: Siemens Aktiengesellschaft, Berlin & Munich, Germany

[22] Filed: Apr. 22, 1974

[21] Appl. No.: 462,667

[30] Foreign Application Priority Data
Apr. 26, 1973 Germany............................ 2321166

[52] U.S. Cl................................. 317/230; 317/242
[51] Int. Cl.² .......................................... H01G 9/00
[58] Field of Search ............... 317/230, 242; 357/72

[56] References Cited
UNITED STATES PATENTS

| | | | |
|---|---|---|---|
| 1,032,032 | 7/1912 | Staunton............................. | 317/230 |
| 2,011,519 | 8/1935 | Holst et al. ......................... | 317/230 |
| 2,012,691 | 8/1935 | Poitras................................ | 317/230 |
| 2,039,154 | 4/1936 | Emmens et al. .................... | 317/230 |
| 3,411,122 | 11/1968 | Schiller et al....................... | 317/72 |
| 3,463,969 | 8/1969 | Wershey............................. | 317/230 |

*Primary Examiner*—Andrew J. James
*Attorney, Agent, or Firm*—Hill, Gross, Simpson, Van Santen, Steadman, Chiara & Simpson

[57] ABSTRACT

A pressure-relief valve for an electrical capacitor which takes the form of a ring-shaped valve element of an elastic synthetic material which closes a valve opening in the housing of the capacitor. The valve member is held in position by a cylinder shaped part which has radial protuberances and which terminates in bulbous head. The bulbous head engages in snap-like fashion with a cooperable opening located in the housing of the capacitor. Suitable recesses are provided at the periphery of the cylindrical member to permit the valve to lift from its seat due to excess pressure within the capacitor.

8 Claims, 3 Drawing Figures

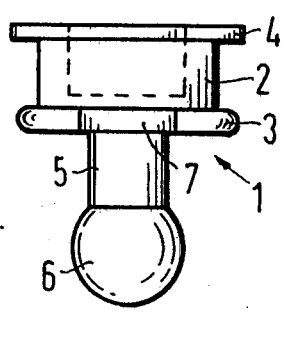
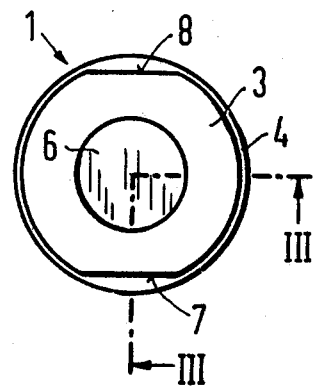
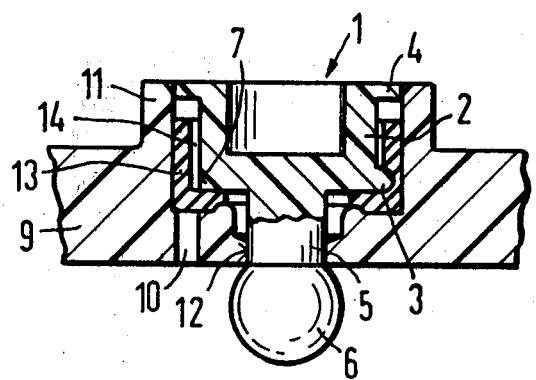

PRESSURE-RELIEF VALVE FOR AN ELECTRICAL CAPACITOR

BACKGROUND OF THE INVENTION

1. Description of the Prior Art

An excess pressure device is known from the German Letters Pat. No. 1,564,673 in which a ring-shaped valve element formed of an elastic synthetic material closes a valve opening and is initially biased against the walls of the valve. The necessary bias is achieved due to the fact that the valve element is pressed against the housing by means of a rivet which holds a washer in place against the element. The diameter of the washer is dimensioned in such a way that the edge of the valve lip can lift off the valve dome.

After pressure balance is achieved, the inside of the capacitor housing is again closed in a gas-tight manner by means of the elastic restoring force of the valve element. The difficulty of this construction is in the fact that the valve element rests against the inner wall of the valve dome only with the force corresponding to the elastic constant of the material being used.

An earlier proposal provides that the washer is constructed in such a way that one of several recesses are located at its edge. By means of this arrangement, the size of the washer can be chosen so that the valve element is pressed rigidly against the inner edge of the valve dome and that it can yield only at those points where the recesses are located.

Another such device is shown in German Gebrauchsmuster No. 1,893,990. This device is formed in two parts which are connected to each other in the manner of a snap button. The difficulties in mounting the known pressure valves are due to the fact that the valve has to be mounted rigidly prior to the finishing of the capacitor housing. There is also the additional danger in such an arrangement that the release of excess pressure also causes liquid to become visible at the outside of the capacitor.

2. Field of the Invention

The field of art to which this invention pertains is relief valves and, in particular, to relief valves for electrical capacitors which are formed of an elastic or resilient type material.

SUMMARY OF THE INVENTION

It is an important feature of the present invention to provide an improved capacitor relief valve.

It is another feature of the present invention to provide a relief valve for a capacitor which is formed of an elastic material.

It is a principal object of the present invention to provide a pressure relief valve for a capacitor which may be readily and quickly assembled.

It is also an object of the present invention to provide a pressure-relief valve for a capacitor which utilizes an elastic valve element, which element is held in place by a cylindrical member having a bulbous portion which snaps into position in the capacitor housing.

These and other objects, features and advantages of the present invention will be understood in greater detail from the following description of the associated drawings wherein reference numerals are utilized to designate a preferred embodiment.

BRIEF DESCRIPTION OF THE DRAWINGS

FIG. 1 shows an elevational view of the pressure-relief valve according to the present invention.

FIG. 2 shows a top view of the valve of FIG. 1.

FIG. 3 shows a sectional view taken along the lines III-III of FIG. 2 and, in addition, showing the capacitor housing into which the valve element may be mounted.

DESCRIPTION OF THE PREFERRED EMBODIMENT

The present invention relates to an excess pressure relief valve for an electrical capacitor which includes a ring-shaped valve element formed of an elastic synthetic material to close a valve opening in the housing lid of a capacitor. The valve element is held in place by a button-like cylindrical member which snaps into position in the capacitor housing.

In the case of electrolytic capacitors with a "wet" electrolyte and in the case of capacitors which are impregnated with an insulating oil, gases may develop during the operation of the device. In addition gases develop during the duplicating process. If the housing in which the capacitors are mounted is sealed, no pressure balance can be achieved between the inside and the outside of the element. In such a case, danger exists that the housing may burst apart by means of the very high pressure and therefore that the capacitor may not be usable. Accordingly, pressure release valves have been provided for capacitors which enable the closing of the valve element in a gas-tight manner while permitting a pressure relief following a pressure buildup inside the device.

Simply providing a hole in the capacitor does not offer a solution, since the electrolytic or insulating oil can be released.

The present invention provides an excess pressure relief valve for electrical capacitors in which the difficulties of the prior art are avoided and which can be produced economically, and which can be readily mounted in an otherwise entirely finished capacitor housing. In addition, the device of the present invention is constructed in such a way that during the process of releasing gas from the element, the liquid contained in the capacitor is collected and not released to the outside.

This is accomplished according to the present invention by using an excess pressure valve design in which the part producing the bias of the valve element is formed as a cylinder and has circular rims at opposite ends of the cylinder. Furthermore, the part producing the bias on the element has an attachment which serves to guide the ring-shaped valve element. In addition, the part producing the bias terminates in a bulbous head which engages in opening in the housing of the capacitor in a snap-like manner. The advantages of the pressure relief valve according to the present invention include the fact that it can be readily manufactured by means of mass production. In addition, it can be constructed in such a way that it can be mounted in a simple manner in a single working step at the end of the manufacturing process. This is in contrast to prior devices which must be rigidly mounted to the capacitor housing prior to the final steps of production. Also, a chamber is formed between the rims associated with the cylinder of the element to contain oil or other liquids which may precipitate from the valve when the valve is operating to relieve internal pressure.

Referring to the drawings in greater detail, the part identified by numeral 1 in FIG. 1, is the part which produces the bias. Part one is formed of an elastic material such as a polyacetic resin. It consists of a cylindrical body 2 which has peripheral rims 3 and 4 at its ends. Furthermore, the part one has an attachment or extension 5 which terminates in a bulbous head portion 6. The outer diameter of the rim 3 is insignificantly smaller than the rim 4. Recesses 7 and 8, shown in FIG. 2, are formed in the rim 3.

In FIG. 2, it can be seen that the recesses 7 and 8 are arranged in the rim 3 which is located closest to the attachment or extension 5.

In FIG. 3, the openings 10 which are used to relieve pressure are coupled from the interior of the capacitor to the valve element. A boring 12 is arranged in the lid 9 of the capacitor housing to receive the bulbous head 6. The valve dome is indicated generally by the reference numeral 11.

The attachment or extension 5 of the bias-producing part one is inserted through the bore 12 as shown. By means of the bulbous head 6 which is connected to the attachment 5 and which outer diameter is larger than the diameter of the bore 12, the part one can be connected to the housing 9 by simply snapping the bulbous portion 6 through the bore 12.

The valve element 13 covers the valve opening 10 and is placed over the attachment 5 prior to assembling. The diameter of the valve element 13 is larger than the inner diameter of the valve dome 11 so that after the assembly of the excess pressure valve, the valve element 13 closes the valve opening 10 and at the same time rests against the inner wall of the valve dome 11 under an initial bias.

FIG. 3 shows that the outer diameter of the rim 3 is chosen in such a way that it corresponds approximately to the inner diameter of the valve dome minus twice the width of the valve element 13. The outer diameter of the rim 4 is chosen in such a way that it is only insignificantly smaller than the inner diameter of the valve dome 11.

In the case of excess pressure in the capacitor housing, the elastic valve element 13, which may be formed of silicon rubber, can lift off the valve opening 10 at points corresponding to the alignment of the recesses 7 and 8. At the same time, the valve lip will lift off the inner wall of the valve dome 11 and thus clear a passage for the higher pressure gas into the atmosphere.

After the inner and outer pressures are balanced, the valve element 13 will again recede against the inner wall of the valve dome 11 and thus close the valve opening 10. Furthermore, the figure shows that between the circular rims 3 and 4 a chamber is formed and which is identified by the numeral 14 to collect any oil or other electrolytic material which may have tended to escape through the passageway 10 as the higher pressure was being released. It should also be noted that the pressure to which the valve responds can be adjusted, simply by altering the dimensioning of the recesses 7 and 8.

I claim as my invention:

1. A pressure relief valve for an electrical capacitor comprising:
   a ring-shaped valve element formed of a relatively elastic material,
   a bias producing part having a cylindrical portion,
   said cylindrical portion having a pair of radially outwardly extending rims formed at opposite longitudinal ends thereof,
   said cylindrical portion having an extension terminating in a bulbous head,
   a capacitor lid having a relief valve opening and a central opening for receiving said bulbous head,
   the ring-shaped valve element being caused to overlie and close the relief valve opening
   said bulbous head being snap fitted through said central opening and having one of said radial rims resiliently biased into contact with said valve element to close the same against said valve opening.

2. A pressure relief valve in accordance with claim 1 wherein said bulbous head has a diameter which is greater than said central opening so that said head may be snapped through said opening and thereby firmly retained in place.

3. A pressure relief valve in accordance with claim 1 wherein one of the radially outwardly extending rims has at least one recess formed therein to permit the valve element to lift off the valve opening at that portion.

4. A pressure relief valve in accordance with claim 3 wherein the outer diameter of one of said rims is slightly smaller than the inner diameter of the valve housing in which it is mounted and wherein the outer diameter of the rim which is located closest to the bulbous portion corresponds to the inner diameter of the valve housing minus twice the thickness of said ring-shaped valve element.

5. A pressure relief valve in accordance with claim 1 wherein said bias producing part is formed of a polyacetic resin and said ring-shaped valve element is formed of silicon rubber.

6. A pressure relief valve comprising:
   a capacitor lid having a valve opening and a retention opening,
   a valve element normally overlying and closing said valve opening,
   a valve retention piece including a body portion having an extension terminating in a bulbous head,
   the bulbous head being snapped through the retention opening,
   said body portion coacting with the capacitor housing to resiliently retain the valve element in in its normally closed position, and
   said valve retention piece having means permitting said valve element to deflect upon increases in pressure interiorly of the capacitor to release said pressure to the outside.

7. A pressure relief valve in accordance with claim 6 wherein said means permitting said valve element to deflect comprises a preselected composition of the valve element and a number of recesses formed in said body portion of the retention piece.

8. A pressure relief valve in accordance with claim 7 wherein said recesses comprise removed chords of a rim formed exteriorly of the body portion of the retention piece.

* * * * *